United States Patent [19]
Smiley

[11] Patent Number: 5,978,811
[45] Date of Patent: Nov. 2, 1999

[54] INFORMATION REPOSITORY SYSTEM AND METHOD FOR MODELING DATA

[75] Inventor: Phillip L. Smiley, Plano, Tex.

[73] Assignee: Texas Instruments Incorporated, Dallas, Tex.

[21] Appl. No.: 07/921,826

[22] Filed: Jul. 29, 1992

[51] Int. Cl.$^6$ .................................................. G06F 17/30
[52] U.S. Cl. ............................ 707/103; 707/1; 707/100; 707/102; 707/104; 705/1
[58] Field of Search ............................ 395/600; 707/103, 707/1, 10, 100, 102, 104; 705/1

[56] References Cited

U.S. PATENT DOCUMENTS

| | | | |
|---|---|---|---|
| 4,479,196 | 10/1984 | Ferrer et al. | 395/600 |
| 4,805,099 | 2/1989 | Huber | 364/300 |

OTHER PUBLICATIONS

J. V. Joseph et al. "Object–Oriented Databases: Design and Implementation" Proc. IEEE, vol. 79, No. 1, pp. 42–64, 1991.

Blaha et al "Relational Database Design Using Object Oriented Methodologies" Comm. ACM, pp. 414–428, Apr. 1988.

Burns et al "A Graphical Entity Relationship Database Browser" IEEE Computer, pp. 694–704, 1988.

*Primary Examiner*—Paul V. Kulik
*Attorney, Agent, or Firm*—Robert L. Troike; Tammy L. Williams; Richard L. Donaldson

[57] ABSTRACT

A data model for an information repository (10) models data as objects (12), the relationships (14) or interdependencies between the data, their physical storage or access information (18) and rules or methods of accessing the data (16).

11 Claims, 2 Drawing Sheets

INFORMATION REPOSITORY SYSTEM AND METHOD FOR MODELING DATA

NOTICE

COPYRIGHT© 1992 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention relates in general to the field of computer system and software, and more particularly to an information repository system and method.

BACKGROUND OF THE INVENTION

With the advent of the Information Age, data collection and maintenance play a vital role in the operation of any enterprise regardless of the nature of its business. An enterprise may use computer application software to collect and manage data from such diverse areas as human resource management, manufacturing, planning and control, financial planning, product marketing, and customer relations. As a result, a tremendous amount of information are collected and stored in numerous diverse and often disjoint computer systems and databases. Because the physical as well as the logical linkages between pieces of data and among databases are typically inadequate to interrelate them, critical business and management decisions are often made based on an incomplete set of information.

Efforts in the industry have been made to attempt to address this problem. These include bill-of-materials, data dictionary, directory management, software configuration management systems, and some specialized decision support systems. However, conventional systems attempt to identify specific areas of enterprise information, define relationships that exist therebetween, identify ways to implement those relationships, and then implement a system to represent them. Since each application performs this task independently of the others, there is duplicated effort in building the data definitions and relations. Often the data themselves are modeled more than once by different applications. Most of these applications require trained MIS (management information system) personnel to formulate the queries for accessing desired data.

Accordingly, a need has arisen for a generic framework or information repository for shared enterprise information and data modelling. The information repository is capable of integrating all enterprise data and information and furthermore providing easy data access and navigation by non-MIS personnel.

SUMMARY OF THE INVENTION

In accordance with the present invention, information repository system and method are provided which substantially eliminate or reduce disadvantages and problems associated with prior systems and methods.

In one aspect of the present invention, a method for modelling data in an information repository comprises the steps of identifying and defining a plurality of data objects containing data of interest and formulating relationships between the data objects. Physical storage information for each of the data objects are further defined. The data objects, relationships and physical storage information are then stored as a network where the data objects are a plurality of nodes and the relationships therebetween are connectivities between the data objects.

In another aspect of the present invention, a data model for an information repository system is provided. Data of interest are modeled as a plurality of objects and data interdependencies are modeled as relationships interconnecting the plurality of objects.

In yet another aspect of the present invention, a preferred embodiment of an information repository comprises at least one database storing and maintaining a collection of enterprise data. The collection of enterprise data includes objects containing data of interest, relationships between the objects, physical storage information of the objects, and accessibility information of the objects. A navigator connected to the database is also provided for enabling a user to browse among the objects and relationships.

An important technical advantage of the present invention enables the incorporation of legacy data, which are defined as existing database applications, as well as new applications being developed and yet to be developed, into a generic information repository regardless of their technology, platform or format. In addition, the present information repository data model accomplishes this tremendous task without requiring a large number of data storage files or databases.

BRIEF DESCRIPTION OF THE DRAWINGS

For a better understanding of the present invention, reference may be made to the accompanying drawings, in which.

DETAILED DESCRIPTION OF THE INVENTION

Figure 1:
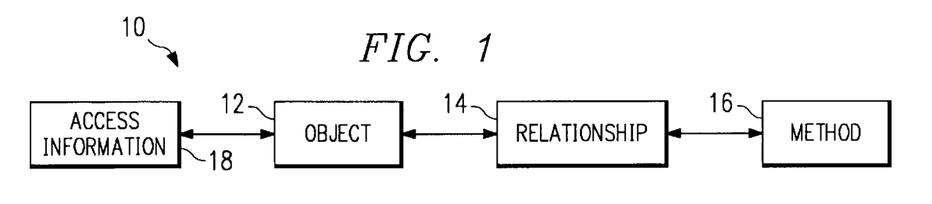
FIG. 1 is an entity relationship diagram of a preferred embodiment of the information repository scheme.

With reference to the drawings, FIG. 1 illustrates a preferred embodiment of the information repository system and method, indicated generally at 10 and constructed according to the teaching of the present invention. FIG. 1 is an entity relationship diagram showing the basic unit for modelling information. An OBJECT 12 is defined as any information of interest to be stored in information repository 10. OBJECT 12 may contain, for example, a graphical representation of a circuit design, the name of an application software routine, a product name, a customer's orders, a database containing product prices, etc. OBJECT 12 preferably contains attributes or fields which provide additional information of itself, such as the name of OBJECT 12 represented by characters, for example, the name of its owner in characters, and the data type, length and format of the data stored in OBJECT 12. Alternatively, the attributes of OBJECT 12 may be configured as other OBJECTS, which are logically related to OBJECT 12 via a RELATIONSHIP entity 14.

Dependencies between OBJECTS 12 are maintained in RELATIONSHIP entity 14. For any OBJECT 12 having other dependent OBJECTS there is one entry in a RELATIONSHIP table for each of these dependent OBJECTS. For example, an OBJECT 12 may be a product name, another OBJECT 12 may be defined by RELATIONSHIP entity 14 as containing that product's description. N other OBJECTS may be defined by N RELATIONSHIP entities 14 as containing N price break definitions based on quantities purchased. Therefore, there may exist one-to-one RELATIONSHIPS, one-to-many RELATIONSHIPS and many-to-one RELATIONSHIP. Furthermore, it is also possible for more than one RELATIONSHIP entity 14 to exist between two OBJECTS 12, or for more than one instance of a RELATIONSHIP to exist between two OBJECT instances. RELATIONSHIP entity 14 preferably contains attributes or fields which record the name of RELATIONSHIP entity 14 represented by characters, the names or identifiers, and types of OBJECTS 12 between which this relationship holds, a sequence number to ensure the uniqueness of RELATIONSHIP entity 14, and the name of a METHOD entity 16 which implements RELATIONSHIP 14.

METHOD entity 16 contains information required to implement a RELATIONSHIP entity 14 in order to present or display the data in OBJECT 12. More importantly, METHOD contains a reference to any routine required to impose application specific logic which defines RELATIONSHIP. For example, METHOD entity 16 may be a software routine that imposes a security clearance requirement before the data in OBJECT 12 may be displayed or otherwise made available to the user. As another example, METHOD 16 may be a software routine that displays product information of a product given a product name. Another METHOD entity 16 may perform logical, arithmetic operations or other data manipulations on the data before presenting it to the user. METHOD entity 16 preferably contains attributes including its name, location, type, execution environment, and execution parameters. METHOD entity 16 is an optional entity, so that it may be omitted if its function is not required or desired.

A fourth entity in the basic unit of information repository scheme 10 is an ACCESS INFORMATION entity 18. ACCESS INFORMATION entity 18 contains information about how the actual data represented by OBJECT 12 is stored and accessed. This entity preferably includes attributes identifying OBJECT 12 and its type describing access parameters, the file format, data store location, name and type, and SQL access.

The generic structure shown in FIG. 1 is the basic unit of information repository scheme 10 that can be used to define any data or information in an application or database environment to form a network of data interconnected by RELATIONSHIP entities 14. A user may navigate in the network via the defined RELATIONSHIP entities 14 to arrive at the desired piece of information. The granularity of the data stored in OBJECT 12 can be defined in accordance to the anticipated usage thereof. The operation and functionality of information repository 10 may be best illustrated by describing several contemplated applications thereof, as discussed in some detail below.

Figure 2:
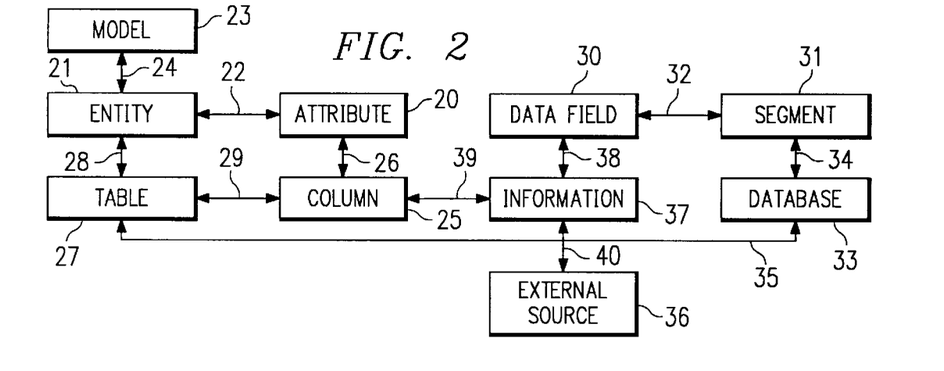
FIG. 2 is a diagram of another application of the information repository scheme of the preferred embodiment for enterprise data modelling.

Referring to FIG. 2, an exemplary application of information repository 10 to enterprise data modelling is shown. Enterprise data modelling is the process of identifying unique enterprise data requirements and assuring that these data definitions are modelled only once by the stewarding application. The data is thereafter shared by any other system that desires access to it. The enterprise data modelling process is made especially challenging since data is typically formatted and stored in a variety of database management systems and further by the requirement that all the business entities have the ability to operate with some degree of autonomy.

The entity relationship diagram, as shown in FIG. 2, illustrates how various mechanisms of enterprise data may be represented in information repository 10 and how they might be related in a single enterprise data model. The OBJECTS include ATTRIBUTES 20, which are technical definitions of data modelled in some computer application. ATTRIBUTES 20 are elementary data definitions such as product name, customer number, employee number, and other data which are of interest to the enterprise. Another OBJECT 12 is ENTITY 21, which is a logical collection of ATTRIBUTES 20. ENTITY 21 CONTAINS 22 ATTRIBUTE 20. CONTAINS relationship 22 documents the one-to-many relationship that each ENTITY 21 has with the attributes it contains. This relationship along with the ATTRIBUTE name, serves to uniquely identify each ATTRIBUTE. The organization of ATTRIBTUES 20 into a given ENTITY 21 is generally based on business rules, performance considerations, data access requirements, or a combination of these. ENTITY 21 represents collections of data that perform a specific task, such as define employee, define customer, or establish a linkage between other ENTITIES 21.

A MODEL 23 is a collection of ENTITIES 21 or CONTAINS 24 ENTITY 21, which represent some part of an enterprise's data requirements. MODEL 23 can contain all the data definitions for a business or for a particular application in that business. Regardless of scope, MODEL 23 always contains one or more ENTITIES 21. Link 24 between ENTITY 21 and MODEL 23 illustrates their relationship and documents the one-to-many relationship that each ENTITY 21 has with MODEL 23. This relationship, along with the name of ENTITY 21, serves to uniquely identify each ENTITY 21. It also provides the basis for navigating from a general MODEL name to the more specific entities.

A COLUMN 25 is a physical implementation of ATTRIBUTE 20 or ATTRIBUTE 20 TRANSLATES TO 26 COLUMN 25. Each COLUMN 25 defines a physical data store for an associated ATTRIBUTE 20 based on the data collected about that ATTRIBUTE 20, such as field type, size, and storage format. Link 26 therebetween illustrates this relationship. TRANSLATES TO 26 documents the one-to-one relationship that exists between ATTRIBUTE 20 in a data MODEL 23 and COLUMN 25, which is the physical implementation of ATTRIBUTE 20. This relationship is also used for navigation from the database abstraction level to the data implementation level.

A TABLE 27 is a physical implementation of a data entry. TABLE 27 defines the physical data store which will contain instances of ATTRIBUTES 20 collected in ENTITY 21 and implemented by that TABLE 27. In other words, ENTITY 21 TRANSLATES TO 28 TABLE 27. For each ATTRIBUTE 20 in an ENTITY 21 there is one COLUMN 25 in the associated TABLE 27. Connectivities 28 and 29 describe the relationships between TABLE 27 and ENTITY 28 and COLUMN 29, respectively. Connectivity 28 or TRANSLATES TO 28 documents the one-to-one relationship between ENTITY 21 in a data MODEL 23 and TABLE 27, which is ENTITY's physical implementation. TRANSLATES TO 28 is the basis for navigation from the data abstraction level to the data implementation level, and is key to the process of querying a data MODEL 23 to view data it represents. TABLE 27 CONTAINS 29 COLUMN 25. This relationship is useful in navigation and in database tuning as well as analysis of existing systems to find redundant data definition.

In an hierarchical database, DATA FIELDS 30 represent storage locations for enterprise data. DATA FIELD 30 defines data's internal name, location in the hierarchical database, storage format, type, and length. A SEGMENT 31 is a collection of DATA FIELDS 30 in an hierarchical database. Similar to TABLE 27, it defines the physical implementation of the DATA FIELDS 30. Similar to ENTITY 21, the collection of DATA FIELDS 30 into SEGMENT 31 is based on business and performance rules. Linkage 32 describes a CONTAINS relationship 32 between DATA FIELD 30 and SEGMENT 31. SEGMENT 31 CONTAINS 32 DATAFIELDS 30. CONTAINS 32 documents the one-to-many relationship between SEGMENT 31 and its DATAFIELDS 30. This relationship is also useful for navigation.

A DATABASE 33 is a collection of physical data implementations. In an hierarchical structure, DATABASE 33 is a physically linked collection of data SEGMENTS 31 or DATABASE 33 CONTAINS 34 SEGMENTS 31. In a relational structure, DATABASE 33 is a logical collection of TABLES 27 or DATABASE 33 CONTAINS 35 TABLES 27.

EXTERNAL SOURCE 36 are sources other than the entity relationship diagram and hierarchical databases described above. EXTERNAL SOURCE 36 may organize data in different data formats and may contain textual as well as graphical information. INFORMATION 37 is the collection of basic data elements to form knowledge that is of benefit or interest to the enterprise. INFORMATION 37 may come from a collection of heterogeneous sources or may originate from a single application. It is the function of information repository 10 to represent INFORMATION 37 without regard to the origin of its elements. INFORMATION 37 is a collection of ATTRIBUTES 20 and DATA FIELDS 30, possibly from many sources, that describes the enterprise or some function of the enterprise. For example, knowledge of customer number from a customer database along with a valid region code comprise information that yield all customer aliases associated with that customer number in that region. Knowledge of customer number, customer alias, and region comprise information yield product name associated that customer's alias in that region. Links 38–40 describes the relationship between INFORMATION 37 and DATA FIELD 30, COLUMN 25, and EXTERNAL SOURCES 36, respectively.

The relationships between INFORMATION 37 and DATAFIELDS 30 and COLUMNS 25 documents the fact that INFORMATION 37 is a logical collection of data from a variety of sources. For example, product description and availability data may be physically implemented on a relational table, product manufacturing data may be on a hierarchical database, and product schematics plan is on a specialized CAD/CAM platform. All the OBJECTS can be grouped together into one logical view of product information and linked via a relationship to a common product name. The product name can be defined as INFORMATION 37 and yields those OBJECTS.

Additional OBJECT definitions to model enterprise data are also defined to facilitate information access. Each ENTITY 21 is defined to have at least one IDENTIFIER (not shown). Each IDENTIFIER is an ordered collection of ATTRIBUTES 20 uniquely identifying an ENTITY 21. Preferably, the IDENTIFIERS are implemented as indexes or keys an the particular ENTITY 21. VIEWS (not shown) are collections of ATTRIBUTES 20 returned when an ENTITY 21 is accessed by a particular IDENTIFIER. VIEWS may return every ATTRIBUTE 20 in the ENTITY 21, including IDENTIFIERS, or it may be artificially constricted by software acting on the database. Further, the feature relationship documents the dependencies between various pieces of the enterprise data model. This includes relationships between distinct occurrences of INFORMATION 37 as well as relationships between pieces of the enterprise data model. Furthermore, a central location for enterprise model definitions may be provided to resolve and identify definition and name inconsistencies. Information repository 10 may further provide context sensitive access of data by permitting different names for the same object, thus supporting common use of one data store by different applications.

Configured and constructed in the manner described above, information repository 10 allows business data modelling to be extended to a true enterprise-wide data model. Data are defined across a variety of engineering information management systems and database management systems. Provisions are also made to document relationships which may not be explicitly defined in other systems.

Figure 3:
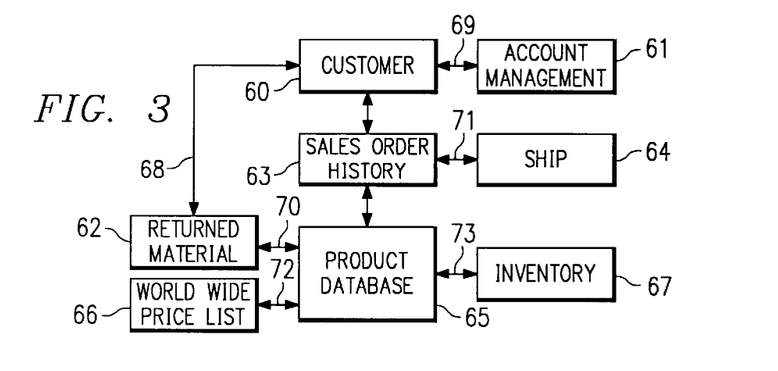
FIG. 3 is a diagram of yet another application of the information repository scheme of the preferred embodiment for operational system documentation.

Referring to FIG. 3, a simplified entity relationship diagram is shown depicting the application of information repository methodology 10 to operational system documentation. Operational systems are used to collect and maintain enterprise data by supporting that enterprise's normal business activities. These activities may include accounts receivable, accounts payable, product quote, customer status, product definition, employee benefits, etc. Not surprisingly, these operational systems frequently share data and business processes across system boundaries. In a conventional arrangement, tracing information through the enterprise may require expertise in many applications and their methods. On those occasions when information is needed across more than one application system boundaries, the collection of this information may require the efforts of many operational experts. Information repository 10 can be used to document ATTRIBUTES 20, INFORMATION 37, RELATIONSHIP entities 14 and METHOD entities 16 within different systems and between systems so that a user can navigate through a series of operationally related systems.

FIG. 3 depicts application systems which function to support an enterprise. These application systems are comprised of ATTRIBUTES 20 collected into ENTITIES 21. These ENTITIES 21, such as customer 60, account management 61, returned material 62, sales order history 63, ship 64, product database 65, world wide price list 66, and inventory 67, are joined by relationship connections 68–73 which represent operational or business rules, to form an operational system network.

The OBJECTS for an operational system's information repository preferably include ATTRIBUTES (not shown), which contain the data of interest to the enterprise. OPERATIONAL METHODS are the existing application programs that display or update the operational data. OPERATIONAL METHODS are used by application customers to access and maintain the operational data. INFORMATION is the collection of data fields, possibly from many sources, to comprise information. For example, knowledge of customer number from a customer data base along with a valid region code comprise information that yield all customer aliases associated with that customer number in that region. Knowledge of customer number, customer alias, and region comprise information which yield product name associated that customer's alias in that region. Another OBJECT may be defined as DATA AND METHOD ATTRIBUTES. These are the attributes that further define the operational data methods in the operational system. INFORMATION AND METHOD RELATIONSHIPS document the relationship between specific information occurrences or between information and the application methods that operate on the information. For relationships between information, i.e. employee number related to name, extension, mail station, it may be appropriate to identify a method which implements that relationship.

An example of the services provided to a user is NAVIGATION. NAVIGATION allows the user to traverse through information relationships in search of a given ENTITY node 21 in the operational system network. Another example is QUERY, which permits a user to find an instance of information in a relationship given the other information and the relationship name.

An operational system, configured in this manner, permits the resolution of many decision support questions by using existing operational data and application methods. The Information repository implementation of operational system documentation provides a single location for documenting these data RELATIONSHIP entities 14 and the METHOD entities 16 for implementing those RELATIONSHIP entities 14. These METHOD entities 14 can then be used as a front-end to a graphical user interface or may be executed stand-alone to obtain the desired data. In addition, re-engineering can be accomplished in a more cost effective manner when an existing system's data structures and methods are well documented. Information repository 10 provides a means to construct and use that information for any system regardless of the modelling or implementation methods used to build that system.

Figure 4:
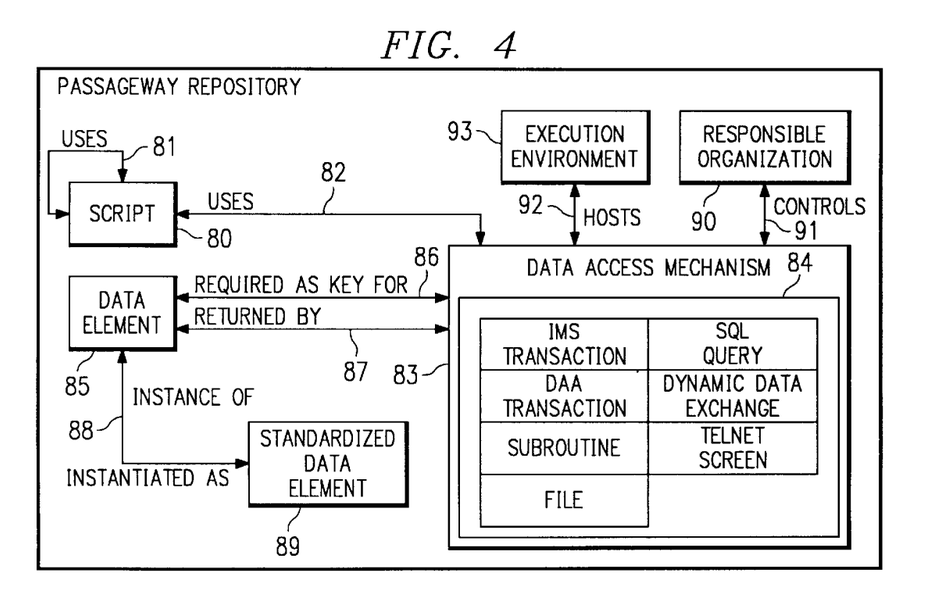
FIG. 4 is a diagram of an application for accessing data from a number of data sources located on diverse computer platforms employing the information repository scheme of the preferred embodiment.

Referring to FIG. 4, an information repository scheme 10 is used in a client/server computing environment which generates macros or scripts to access and manipulate operational data stored on a number of diverse computer platforms. It is desirable to provide a directory of available scripts and visibility to the contents of these scripts in some level of detail. Such a directory would promote script reuse and minimize impact to the system caused by change.

FIG. 4 demonstrates how information repository 10 may be used to represent information in such a computing environment. The labeled connectivities between blocks or objects illustrates the relationship(s) between the connected blocks.

OBJECTS in this implementation include SCRIPTS 80. SCRIPTS 80 are macros which access existing operational data from one or more predetermined data store locations, manipulate the data accordingly, and present the converted data to the user. A given SCRIPT 80 may invoke or use one or more other SCRIPTS 80 and vice versa, as indicated by directed link 81. SCRIPT 80 also uses a number of standard DATA ACCESS MECHANISMS 83 to access the operational data, as indicated by link 82. DATA ACCESS MECHANISMS 83 in turn are executable applications which are invoked to read or update operational data. The availability of certain DATA ACCESS MECHANISMS 83 depends of the physical location of the operational data and the availability of existing operational methods. A variety of DATA ACCESS MECHANISMS 83 are illustrated as examples 84. Also defined is DATA ELEMENT 85. A DATA ELEMENT 85 is an operational data field accessible by SCRIPTS 80 through DATA ACCESS MECHANISMS 83. Depending on the type of DATA ACCESS MECHANISM 83 used, a DATA ELEMENT 85 may be specified as a key to access another DATA ELEMENT 85, which returns the desired DATA ELEMENT 85, as indicated by relationships 86 and 87.

The relationship 88 between STANDARDIZED DATA ELEMENT 89 and DATA ELEMENT 85 maps multiple name definitions for a single DATA ELEMENT 85 to a unique or standardized data element to provide a uniform naming scheme. Another entity is defined as RESPONSIBLE ORGANIZATION 90. RESPONSIBLE ORGANIZATION 90 is associated with DATA ACCESS MECHANISM 83 as the organization which created it and is thus responsible for it. For example, the RESPONSIBLE ORGANIZATION 90 for executable load modules is an application group. For scripts, that organization is the group that maintains the script. In other words, the RESPONSIBLE ORGANIZATION 90 controls its respective DATA ACCESS MECHANISMS 83, as indicated by RELATIONSHIP LINK 91. The RELATIONSHIP 92 between EXECUTION ENVIRONMENT 93 and DATA ACCESS MECHANISM 83 establishes a link 93 from each DATA ACCESS MECHANISM 83 to the specific computing facility or host on which it executes.

Further OBJECT definitions of information repository 10 in the current context include DATA FIELDS and DATA ATTRIBUTE COLLECTION (not shown). DATA FIELDS are operational data attributes retrieved by SCRIPT files 80. It is desirable to relate DATA FIELDS to SCRIPTS 80 and to native DATA ACCESS MECHANISMS 83 to promote script reuse as well as to ensure use of the correct DATA ACCESS MECHANISM 83. Additionally, descriptive data may be linked to a DATA FIELD to clarify the context in which it is to be used. DATA ATTRIBUTE COLLECTION is the descriptive or location information associated with each of the objects described above. The information includes script name, owner, script location, audit data, access mechanism name, owner, execution environment, etc.

The services provided by information repository 10 in the script sharing environment preferably give the user accessibility to data access mechanism changes, SCRIPT availability, and DATA FIELD definition required to support system customers. Additionally, a user may identify SCRIPTS 80 implemented by other SCRIPTS 80, SCRIPTS 80 or DATA ACCESS MECHANISMS 83 which return desired DATA FIELDS. A user may also navigate from desired DATA FIELDS to required input DATA FIELDS. The navigation function is the key to promoting script reuse and identifying potential impact on the computing environment if an application DATA ACCESS MECHANISM changes its format.

Information repository 10 gives the users a view of existing SCRIPTS 80 their associated data. If the user finds a script that meets her needs, she can then use that script rather than develop a second similar one. If the user does not find an appropriate script, she may browse DATA ACCESS MECHANISMS 83 and DATA FIELD definitions themselves to collect information needed to build a new SCRIPT 80. This practice promotes script reuse and better use of resources. Repeatable query via information repository 10 ensures the continued integrity of the scripts by eliminating the dependency on application transactions and establishing a link to repository maintained data relationships.

A major difference between object oriented systems and other systems is the existence of a class hierarchy. The class hierarchy defines a hierarchical structure through which variable definitions and methods are proliferated or inherited. This means that any given node (class) in the hierarchy immediately "inherits" all the variable definitions and methods belonging to its immediate predecessor in the class hierarchy. Another unique feature is the concept of polymorphism. Polymorphism is the practice of defining the same named method in different classes and having that method execute possibly distinct tasks from one class to the next.

Class hierarchies in object oriented systems are powerful tools. They allow variables and methods to immediately be assigned to new sub-classes as soon as the new sub-class is added. Further, this happens with no impact on any of the existing sub-classes. However most object oriented systems are lacking in that they support only one class hierarchy. The application of information repository 10 resolves the problems faced by typical object oriented systems.

The preferred OBJECT definitions for implementing an object oriented system via information repository 10 include CLASSES (not shown). CLASSES are the fundamental entities in an object oriented system. They own data definitions and methods and proliferate these objects through the class hierarchy structure. METHODS are defined to information repository 10 as being associated with their originating CLASS. DATA DEFINITIONS are the data structures maintained by an object oriented system. As with METHODS, they need to be associated with their originating CLASS. CLASS HIERARCHY, establishes the framework for DATA DEFINITION and METHOD inheritance. The CLASS HIERARCHY is built by defining each CLASS, identifying the DATA DEFINITIONS and METHODS that belong to each CLASS, and then defining the hierarchical RELATIONSHIPS between the CLASSES. The ability to browse this hierarchy and view the contents of each CLASS are critical to the maintenance of object oriented systems.

In an information repository implemented object oriented system, it is contemplated that the ability of proliferating METHODS and DATA DEFINITIONS from one CLASS in the CLASS HIERARCHY to all the lower or children levels beneath that CLASS is a direct extension of the concept of data navigation. This proliferation continues to all CLASSES for which the given METHOD or variable is not explicitly defined. The definition of METHODS, variables, and their CLASS HIERARCHY in the repository along with the software functions of the repository allow this proliferation to take place. An additional service is polymorphic method documentation.

A polymorphic method is one that is defined to different CLASSES and possibly acts differently on the DATA DEFINITIONS in those CLASSES. This feature of object oriented METHODS shields developers from details of the METHODS they use and thus simplifies system development.

Similarly, polymorphism allows new variables with distinct logic rules to be added with minimal impact on existing variables or METHODS. However, traceability requires a developer of an object oriented system to find all possible implementations of a given named METHOD. Inheritance in object oriented systems often means that a variable in a given CLASS may be acted on by a METHOD from a higher CLASS. Traceability requirements include the ability to find the origin of a given METHOD used on a variable in a given CLASS.

Multiple inheritances is the process of defining multiple origins for inherited variable DEFINITIONS and METHODS. While there are procedural issues regarding the context in which multiple inheritances are searched for variable DEFINITIONS and METHODS, the need for multiple inheritances has been demonstrated.

Several conventional object oriented development tools provide a means for building object oriented systems but all have limited support for analysis and reporting of the developed class hierarchy and method implementation within that hierarchy. The information repository data and relationship definition and navigation capabilities provide a greatly beneficial supplement to these tools by providing a directory of methods and variables. Additionally, information repository 10 can be used to actually define a class hierarchy, and associate its methods, and variables.

Other useful applications of the information repository scheme 10 includes the modelling of decision support systems (not shown). Decision Support Systems provide specialized analysis and update on existing operational data. These systems differ from operational systems in that they access data from across system and organizational boundaries, have a small and infrequent customer base, and may require views of the data that differ from the typical operational views. These systems may create separate data bases or files which contain selected operational data. Before being loaded into these decision support data bases, this operational data may be subjected to further logic or mathematical modification. This data is then accessed and manipulated by DSS software, commercially available vendor software, or both.

OBJECT definitions for the decision support system information repository may include OPERATIONAL DATA. OPERATIONAL DATA are data elements in operational data bases that are of interest to their systems. OPERATIONAL METHODS are the existing application programs that display or update the operational data accessed by the decision support system. These may be used as part of the extract process, as a front-end to a graphical user interface, or for ultimate update of the operational data in the originating data base. OPERATIONAL METHODS are especially important for update since they contain necessary business rules and security for update. DSS METHODS differ from OPERATIONAL METHODS in that they are unique to the decision support system (DSS), and which are used to extract or manipulate the operational data in the DSS data base. Another OBJECT may be defined as INFORMATION COLLECTION. INFORMATION COLLECTION is the collection of DATA FIELDS, possibly from many sources that comprises information. For example, knowledge of customer number from a customer data base along with a valid region code comprise information that yield all customer aliases associated with that customer number in that region. Knowledge of customer number, customer alias, and region comprise information which yield product name associated that customer's alias in that region. DATA AND METHOD ATTRIBUTES further define the data and methods of interest to the DSS. DATA AND METHOD ATTRIBUTES may include data field name, data field location, data field owner, method name, method owner, and method execution environment. This category could also include any information that facilitates the acquisition and use of the operational data. INFORMATION AND METHOD RELATIONSHIPS document the relationship between specific information occurrences or between information and the application or DSS methods that operate on the information. For relationships between information, i.e. employee number related to name, extension, mail station, it may be appropriate to identify a method which implements that relationship. For other relationships, there may not be an implementing method in existence.

Another application of information repository 10 is database generation. Database generation involves the collection of database attributes and the examination of various configurations of those attributes to find the best physical representation to solve a specific data storage problem. Other factors affecting the physical result are frequency of access and other performance issues. Information repository 10 provides database administrators a single location for collecting the results of data modelling. Additionally, this location is then used as the source for developing a physical implementation of the data model. This source can be easily modified to test various physical schema and combinations of attribute data.

Yet another advantageous application of information repository 10 is product genealogy modelling to facilitate product genealogy searches. A product genealogy search is the process of identifying the parts and processes that were used to develop a finished product as well as identification of the locations where these processes took place. For example, two occurrences of a semiconductor device may be materially different even though they function identically. Common differences are component country of origin assembly country of origin, and other material. Over time, all of these distinctions are significant in the semiconductor business. Increasing prices for precious metals drives up the cost of gold wire; import quotas or customer requirements limit import form certain countries.

Therefore, three key elements are required to solve this problem via information repository scheme 10. First part and process data must be collected and must be assigned to unique occurrences of work-in-progress products. Second, there must be a location for storing this data and accessing it when necessary. Finally, the work-in-progress data of interest will vary over time. This means that the data collection technique must be easily modifiable. All three of these requirements can be satisfied using information repository 10. First, categories of interest (assembly country of origin, die country of origin, precious metal content . . .) must be identified, defined to the repository, and values instanced. In order to completely satisfy the first step, work-in-progress (WIP) values must be defined and instanced also. Second, the relationship structure must be determined and instanced in the repository. These two steps provide a structure for entering and retrieving WIP data as products are built and sold. The ability to add new data elements and relationships and retrieve this data via existing APIs (application program interface) satisfies the third requirement. By using information repository 10 in this context, access to part and process data for a specific occurrence of a product enables an enterprise to correctly meet government and customer requirements regarding product structure as well as accurately track product content. The information repository supports this effort in an easily modifiable manner without massive re-engineering of existing systems.

Information repository scheme 10 is also applicable to the arena of distributed software tracking. Because Information Engineering Facility (IEF) and other computer aided software engineering (CASE) tools generate load modules for multiple platforms, the capability to run the same software on multiple platforms increases. While this facilitates the use of less expensive computers, it presents a software management problem of timely identification of all executable load modules generated from a single CASE OBJECT. This problem arises during the development cycle when that CASE OBJECT is modified or regenerated and at run time when there are multiple choices for executing a given load module.

Therefore, information repository 10 may be applied to this problem so that, given a CASE OBJECT, information repository 10 enables distributed software managers to see the load modules generated from that OBJECT and the platforms on which those modules run. Conversely, given a load module, the associated CASE OBJECT can be identified. This may be accomplished by defining OBJECT NAMES, which represent the CASE OBJECTS used to generate load modules that run in a distributed environment. LOAD MODULE NAME is defined as executable modules which are generated from the CASE OBJECTS. For any given CASE OBJECT, there are possibly many LOAD MODULES running on distinct platforms. In addition, COMPUTER PLATFORM NAMES are defined along with RELATIONSHIPS. RELATIONSHIPS are defined between OBJECT NAMES, LOAD MODULE NAMES, AND COMPUTER PLATFORM NAMES so that a user may navigate among these data elements.

Figure 5:
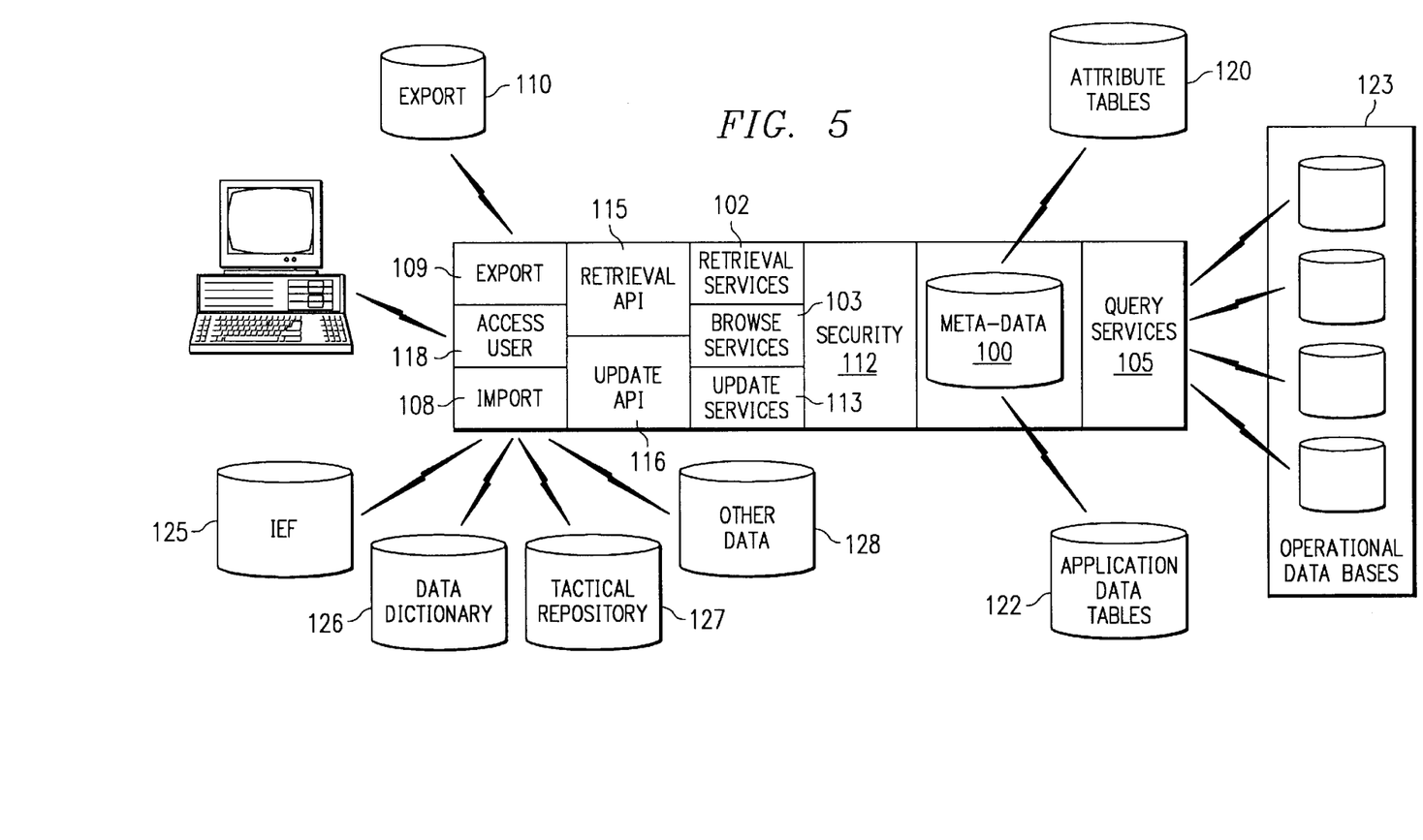
FIG. 5 is a simplified diagram of an information repository system architecture in accordance with the preferred embodiment of the present invention.

Referring to FIG. 5, a simplified block diagram of the preferred system architecture and integration of information repository 10 is shown. The information repository 10 provides a common reference for enterprise data which may exist in many different formats and may be located on many different platforms. This reference is maintained in a database containing meta-data 100, or data about data, describing selected operational data. Meta-data database 100 contains OBJECTS 12, RELATIONSHIP entities 14 between OBJECTS 12, and METHODS 16 used to instance those RELATIONSHIP entities 14. Additionally, this database 100 contains data store location and ACCESS INFORMATION entity 18. OBJECTS 12 and RELATIONSHIP entities 14 therebetween provide the framework or network for data navigation and query used in decision support applications.

Meta-data database 100 along with retrieval and browsing services 102 and 103, respectively, provide repository users with a directory or navigator through the data in information repository 10. Access to named repository elements and their associated attributes will be provided via repository retrieval services 102. Retrieval services 102 accomplishes this function by requesting an IDENTIFIER for a specific repository OBJECT 12 and retrieving a predetermined VIEW of its associated data in response thereto. Browsing 103 differs from retrieval 102 in that the data requested is not fully identified. Instead a partial or starting IDENTIFIER is provided and a set number of repository data elements and a predetermined collection of attributes are returned. Therefore, the function of this directory or navigator is to build a framework which puts the operational data in a more accessible context and facilitates acquisition of that operational data.

Operational data acquisition is further supported via query services 105 in conjunction with browsing and retrieval services 102 and 103. Query services 105 provide access to the operational data represented in information repository 10. Information repository 10 also supports exits to access of operational data from the repository user access service. These 'ad hoc queries' take data values for a given OBJECT 12 along with a specified RELATIONSHIP entity 14 and return the data values for the other OBJECT 12 in the RELATIONSHIP entity 14.

In addition, repository import and export services 108 and 109 provide archival and transportability functions for repository data. Import services 108 provide the means for loading data on the information repository databases from a neutral format. This supports migration across repositories and repository data restore services. Export services 109 provide a mechanism for extracting, to a neutral format, all or part of the data in the information repository databases. Export services 109 support migration of data across repositories, data archival, and repository data backup services.

Information repository 10 must also control the accessibility of the data stored in meta-data database 100. Access and update to data in the repository databases are controlled by a security function 112. Security function 112 maintains a profile for each authorized user describing which repository elements he can access and what functions can be performed on those elements. An update service 113 allows update of specific repository OBJECTS 12 by providing a unique IDENTIFIER and associated data for the object to be updated.

Retrieval API 115 allows non-repository applications to access repository data either via retrieval services 102 or by browsing partially qualified data elements. Retrieval API 115 uses standard retrieval and browse services 102 and 103 provided by the repository which, in turn, use the security functions 112 supporting the repository databases. Update API 116 uses repository update services 113 and associated security functions 112 to update specific repository data elements.

A user access services 118 provide repository users with the ability to retrieve, browse, and update information repository data in text format. User access service 118 also functions as a front end to any graphical user interface which may be used for a graphical representation of the data structure or network of information repository 10. Both types of query are discussed in more detail later in this document.

It is possible that data described by the information repository will not exist in existing operational data bases. It may be the case that the relationship between a data base, it's tables (or segments), and data fields are described in the information repository. It is then possible to further the attributes of a data base in separate tables, related to but separate from, the repository. These are the attribute tables 120. This data can then be used to generate the physical implementations represented by the application data tables 122.

Operational data bases 123 represent the existing application base represented by the information repository. These are applications that serve a specific purpose for the enterprise but may be related to other applications in some manner.

IEF 125, data dictionary 126, tactical repository 127, and other data 128 all represent external sources for repository data. IEF data contains objects and relationships for IEF (Computer Aided Systems Engineering) applications. Data dictionary 126 is a single location for the definition of hierarchical data bases. Tactical repository 127 represents the many application-specific efforts to solve the repository problem. All these sources contain some level of information (or objects) and relationships between that information. These two elements describe a data network which needs to be navigated in some level of detail to benefit the enterprise.

Although the present invention has been described in detail, it should be understood that various changes, substitutions and alterations can be made thereto without departing from the spirit and scope of the present invention as defined by the appended claims.

What is claimed is:

1. A method for modelling data in an information repository, comprising the steps of:

identify and defining a plurality of data objects including data;

formulating relationships between said data objects;

defining physical storage information for each of said data objects;

storing said data objects, relationships and physical storage information as a network including a plurality of nodes associated with said data objects and said relationships as connectivities therebetween and;

maintaining a method entity for said information repository including information to implement said relationship in a database.

2. The method, as set forth in claim 1, wherein said maintaining step comprises the step of defining required clearance for accessing said data objects.

3. The method, as set forth in claim 1, wherein said method further comprises the step of specifying data manipulation of said data objects for presenting said data in said object.

4. The method, as set forth in claim 1, wherein said method further comprises the steps of:

accepting a user input specifying one of said data objects and said relationships; and returning one of said data objects and relationships in response to said user input.

5. The method, as set forth in claim 4, wherein said returning step comprises the step of displaying said one of said data objects and relationships.

6. The method, as set forth in claim 1, wherein said data object identification and defining step comprises the step of identifying and defining computer application software and said relationship formulating step comprises the step of formulating relationship between said computer application software.

7. The method, as set forth in claim 1, wherein said data object identification and defining step comprises the step of identifing and defining enterprise data and said relationship formulating step comprises the step of formulating relationships between said enterprise data.

8. The method, as set forth in claim 1, wherein said data object identification and defining step comprises the step of identifying and defining data in operational systems and said relationship formulating step comprises the step of formulating relationships between said data of said operational systems.

9. The method, as set forth in claim 1, wherein said data object identification and defining step comprises the step of identifying and defining databases and said relationship formulating step comprises formulating relationships between said databases and data therein.

10. The method, as set forth in claim 1, wherein said data object identification and defining step comprises the step of identifying and defining object oriented systems and objects therein and said relationship formulating step comprises the step of formulating relationships between said object oriented systems and between objects therein.

11. An information repository, comprising:

at least one database for storing and maintaining a collection of enterprise data, said collection of enterprise data including objects containing data of interest, relationship entity containing relationships between said objects, method entity containing information to implement said relationship entity, access information entity containing physical storage information of said objects and accessibility information of said objects; and a navigator connected to said database for enabling a user to browse among said objects, said relationship entity, method entity and access information entity to build operational data in a more accessible format.

* * * * *